April 27, 1965

L. F. PERWAS 3,180,029

HEIGHT GAGES

Filed Nov. 18, 1960

INVENTOR.
Ludwig F. Perwas
BY
Victor J. Evans & Co.
Attorneys

April 27, 1965  L. F. PERWAS  3,180,029
HEIGHT GAGES

Filed Nov. 18, 1960  8 Sheets-Sheet 2

INVENTOR.
Ludwig F. Perwas
BY
Victor J. Evans &Co.
Attorneys

April 27, 1965

L. F. PERWAS

3,180,029

HEIGHT GAGES

Filed Nov. 18, 1960

INVENTOR.
Ludwig F. Perwas
BY
Victor J. Evans Co.
Attorneys

April 27, 1965

L. F. PERWAS 3,180,029

HEIGHT GAGES

Filed Nov. 18, 1960

INVENTOR.
Ludwig F. Perwas
BY
Victor J. Evans & Co.
Attorneys

April 27, 1965  L. F. PERWAS  3,180,029
HEIGHT GAGES

Filed Nov. 18, 1960  8 Sheets-Sheet 6

INVENTOR.
Ludwig F. Perwas
BY
Victor J. Evans & Co.
Attorneys

United States Patent Office 3,180,029
Patented Apr. 27, 1965

3,180,029
HEIGHT GAGES
Ludwig F. Perwas, 807 Union Ave., Bronx, N.Y.
Filed Nov. 18, 1960, Ser. No. 70,213
2 Claims. (Cl. 33—170)

This invention relates to tubular or planer height gages.

This invention is an improvement over the height gages of prior Patent No. 2,914,857, dated December 1, 1959.

The primary object of this invention is to provide planer height gages which are provided with a motor or power driving mechanism so that a telescoping extension can be readily operated, and wherein a micrometer mechanism can be independently actuated or operated as desired, and wherein there is provided an improved method of increasing the height of the planer height gages and wherein according to the present invention the permanent integral projected construction for taking of undersurface and oversurface readings from the same plane is further improved.

A further object of the invention is to provide a planer height gage which is provided with a motorized telescoping mechanism so that the functional height can be readily increased or varied as desired, and wherein there is also provided a motorized micrometer mechanism for facilitating the operation thereof, and wherein the present invention is operated easily and quickly and accurately, and also the present invention will eliminate the necessity of manually operating such a device.

A further object is to provide a planer height gage of the type stated which is economical to manufacture and efficient in use and which is rugged in structure and foolproof in operation.

These and other objects of the invention will become apparent from a reading of the following specification and claims, together with the accompanying drawings, wherein like parts are referred to and indicated by like reference characters and wherein:

FIGURE 16 is an elevational, with parts broken away and in section and corresponding generally to the arrangement of FIGURE 12 and wherein the device is rotated ninety degrees and FIGURE 16 illustrates a micrometer reading opening and the attached single multiple gage secured at the top of the device as well as the removable main for securing a self-winding rule in position.

FIGURE 17 is a sectional view taken on the line 17—17 of FIGURE 16.

FIGURE 18 is a sectional view taken on the line 18—18 of FIGURE 16.

FIGURES 19 through 30 are views illustrating various parts or elements of the device of FIGURE 1, and wherein FIGURE 22 is taken on the line 22—22 of FIGURE 21, and FIGURE 29 is taken on the line 29—29 of FIGURE 28.

FIGURE 32 is a view illustrating certain details of the present invention.

FIGURE 33 is a view illustrating an attachment used for checking proper seating by machinists or the like.

Referring in detail to the drawings, and more particularly to FIGURES 1 through 7 of the drawings, the numeral 19 indicates a graduated micrometer thimble which is adapted to be secured by means of a lock washer 20 and nut 21 to a micrometer screw 22. The inner race of a ball bearing assembly 23 is secured to the lower end of the micrometer screw 22 by means of a nut or fastener 24, and the outer race of the bearing 23 engages a recess in the upper portion of the top end cap 25 of the motor 26.

Figures 1, 2, 3, 4:
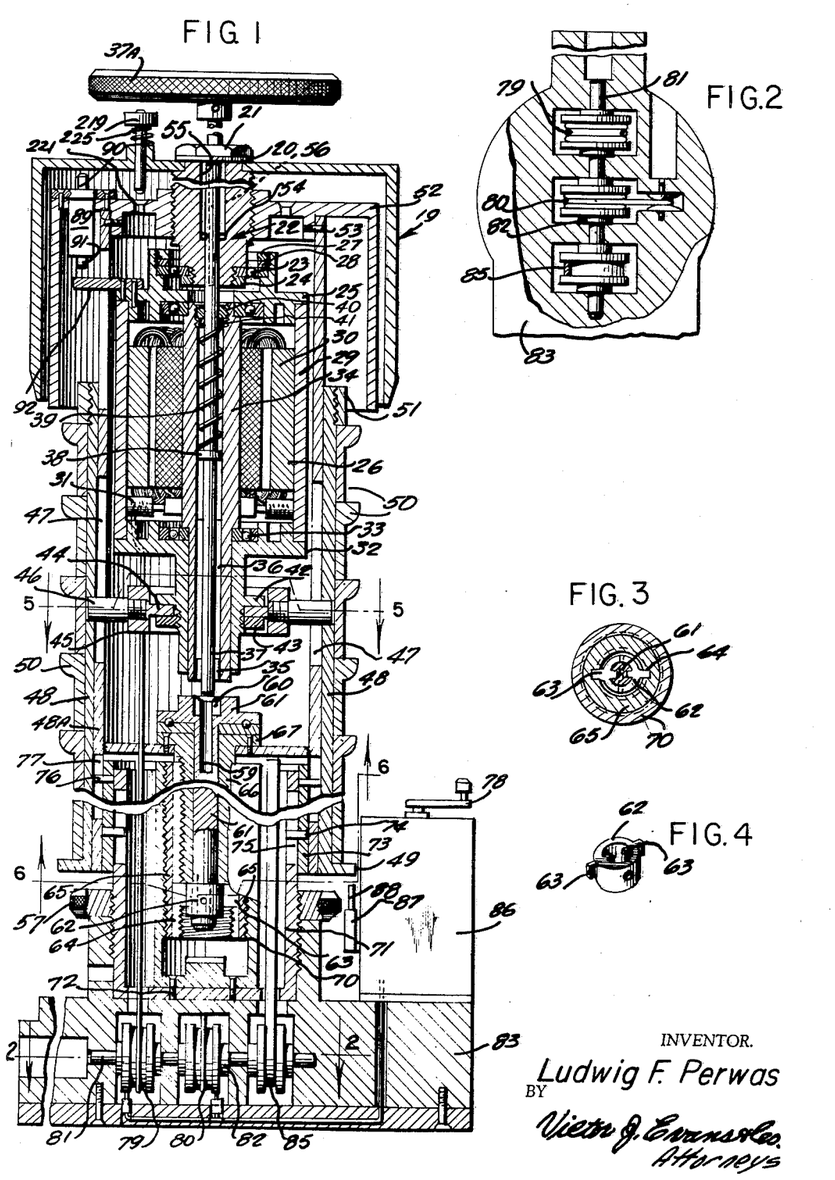
FIGURE 1 is a longitudinal sectional view of a motorized telescoping planer height gage constructed according to the present invention.
FIGURE 2 is a fragmentary sectional view showing a portion of the bottom of the device of FIGURE 1.
FIGURE 3 is a horizontal sectional view illustrating a driving key mechanism.
FIGURE 4 is a perspective view of the driving key shown in FIGURE 3.

The numeral 27 indicates a threaded lock ring, and there is also provided a lock washer 28 which is arranged in engagement with the same recess to secure the outer race of the bearing 23 to the top end cap 25, and the cap 25 is adapted to be affixed to the motor sleeve 29 in a conventional manner.

Attached or affixed to the sleeve 29 in a conventional manner is a stator 30, and the numeral 31 indicates a brush holder, and there is provided a lower end cap 32 which has a special construction. Central recesses on the inside of the end caps 25 and 32 engage the outer races of ball bearings 33, and the inner race of the bearings 33 are arranged in engagement with a hollow armature shaft 34, the shaft 34 being provided with spline slots 35 at the bottom thereof, and these slots 35 are adapted to engage or coact with corresponding splines 36 on a control shaft 37. The shaft 37 is provided with a flange 38 which is adapted to retain the compression spring 39 in its proper location, and a lock washer 40 and nut 41 maintain the upper portion of the compression spring 39 in place at the top of the hollow armature shaft 34.

The cap 32 is provided with a flange 42, and a nut 43 serves to secure the inside flange 44 of a key lift rod retainer 45 to the flange 42, and the retainer 45 is provided with bores for receiving the threaded portions of key lift rods 46, and the key lift rods 46 are arranged in engagement with precision formed elongated key slots 47. The unthreaded ends of the key lift rods 46 firmly engage precision bores in a telescoping multiple gage ring support tube 48. The support tube 48 is provided with a banking flange 49 on the lower end thereof for retaining the multiple gage ring 50 in place, and the upper end of the tube 48 is threaded to receive a lock ring 51 in order to secure or fasten the multiple gage ring 50 to the support tube 48.

As shown in the drawings the threads of the micrometer screw 22 engage a threaded recess of the graduated micrometer barrel sleeve 52 which is attached by means of suitable securing elements such as screws 53 to the upper end of the telescoping support tube 48. The numeral 54 indicates a pin which is press fitted to the shaft 37, and the pin 54 projects through the micrometer screw 22 and engages the partial spline slot 55 for selectively operating the micrometer mechanism, and the pin 54 is adapted to project through the spline slots 56 for independently or selectively operating the telescoping extension unit of the device as later described in this application.

It is to be noted that when the pin 54 of the shaft 37 engages a partial spline slot 55 of the micrometer screw 22, and the motor is functioning, the splined slot 35 of the armature shaft 34 is engaged by the spline 36 of the control shaft 37 so as to drive the micrometer screw 22, and the attached graduated micrometer thimble 19 up or down depending upon the rotary direction of the armature shaft 34. As the micrometer screw moves up or down, the motor 26, key lift rod retainer 45, key lift rod 46, gage support tube 48, and multiple gages 50 likewise move in a corresponding direction since they are connected one to another except for the multiple gages 50 which are firmly affixed or secured to the support tube 48.

With further reference to the drawings, with the tapered circular edge of the thimble 19 graduated so that one complete revolution is equal to .025", and the stationary graduated micrometer sleeve 52 graduated to 1" by the conventional .025", the zero graduated line of the thimble 19 is set in line with the zero graduated line of the graduated micrometer barrel sleeve 52. In view of the fact that the gage rings 50 are precisely one inch, they are set so that they are checking under surfaces and over-surfaces are relative full inches above the flat surface on which the device is being used, and this is brought about by means of the adjusting nut 57 and by indicating the precision top surface of the banking flange 49 to a full inch or full inches above the surface when the thimble 19 zero graduation is set on the barrel sleeve 52 zero graduation. Furthermore, with the relative parts properly set, accurate micrometer readings and scribings can be made from or onto the parts properly are relatively set up on the same flat surface on which the device is being used or mounted.

When it is desired to extend the functioning height of the device of FIGURE 1, the pin 54 of the control shaft 37 is disengaged from the partial spline slots 55 and then dropped through the spline slots 56 so as to engage a circular recess 58 whereby the pin will be free to rotate without driving the micrometer screw 22. As the pin 54 drops down, the extreme upper portion of the spline 36 of the control shaft 37 engages the spline slots 35 of the armature shaft 34, while the extreme lower portion of the spline 36 at the end of the control shaft 37 engages the spline slots 60 of the flange shaft 61 as the lower non-keyed end of the control shaft 37 engages the bore 59 of the shaft 61.

Figures 5, 6, 7:
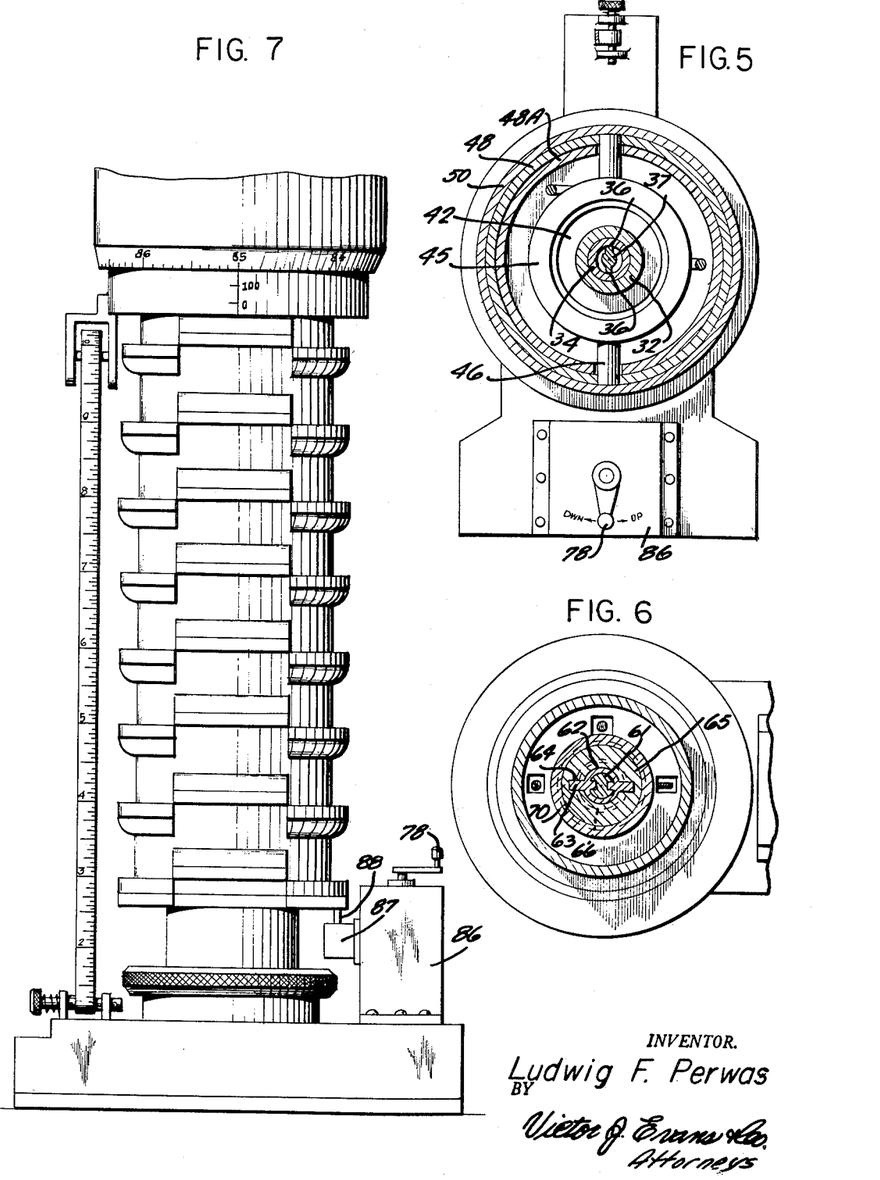
FIGURE 5 is a sectional view taken on the line 5—5 of FIGURE 1.
FIGURE 6 is a sectional view taken on the line 6—6 of FIGURE 1.
FIGURE 7 is a fragmentary elevational view corresponding to FIGURE 1.

As shown in the drawings the flange shaft 61 is driven by the spline 36 of the control shaft 37 so as to drive a double key drive 62, FIGURES 3, 4 and 5, which is positioned at the lower end of the shaft 61 by means of a dowel pin and which is firmly keyed in position by the inner keys of the drive 62 and outside key slots of the shaft 61. As shown in the drawings the outer key spline 63 of the drive 62 engages the inner key spline slot 64 of a middle double threaded telescoping drive tube 65, and the inner threads of the drive tube 65 engage an outside threaded portion of the stationary inner telescoping tube 66 which has a flange 67 secured to the integral support tube plate 68 by means of screws 69 and this prevents the tube 66 from revolving or turning. In addition, the outer threaded portion of the middle double threaded telescoping tube 65 is arranged in engagement with an inner threaded portion of the outer telescoping tube 70 which is secured to an inner telescoping precision slide tube 71 by means of suitable securing elements such as screws 72.

Arranged in engagement with the telescoping precision slide tube 71 is a middle precision slide tube 73 which is provided with a press fitted key pin 74 for engaging the key slot 75 of the slide tube 71, and a press fitted key pin 76 engages the key slot 77 of a precision elongated support telescoping slide tube 48A in order to prevent the precision slide tubes from rotating. It is to be noted that as the spline 36 on the control shaft 37 engages the armature 34 and the spline slots 60 of the flange driven shaft 61, the slide tubes 48A, 71 and 73 move upward when the control lever 78 is engaged at up, as the double key drive 62 drives the double threaded middle telescoping drive tube 65 which extends the length of the three threaded telescoping tubes 65, 66 and 70, since the rotating telescoping motion of the middle tube 65 is applied to the stationary tubes 66 and 70.

The numeral 78 indicates a control lever, and when the control lever 78 is engaged at down position, the slide tubes 48A, 71 and 73 descend so as to lower the multiple gage section. As the multiple gage section is raised or lowered the lead wires to the motor are payed out from the pair of spools 79 and 80 which are on a shaft 81, and if desired or required spacers such as the spacers 82 may be provided on the shaft 81, and the shaft 81 is mounted in a base 83. There is also provided a third spool 84 which has a rewind coil spring 85 arranged in engagement therewith, and the spring 85 is attached to the integral support tube plate 68. Thus, as the device is lowered the spring 85 rewinds force actuates the shaft 81 through the firmly affixed spool 84, and the spool 84 actuates the lead wire spools which are also firmly affixed so as to rewind the lead wires 79 and 80 at the proper time.

The numeral 87 indicates a Micro-switch which is mounted on a conventional or standard reversing control box 86, and the Micro-switch 87 is provided with a contact rod 88 for engaging the bottom surface of the banking flange 49 in order to cut off the electric power so as to stop the device at a preset safety height in order to prevent the press fitted key pins 74 and 76 from contacting the end of their respective engaging key slots 75 and 77, as for example when operating the telescoping extension unit.

The numeral 89 indicates a double end Micro-switch which is mounted on the top of the barrel sleeve 52, between the barrel sleeve 52 and the support slide tube 48, and the top end 90 of the Micro-switch 89 is set to engage the top inner surface of the thimble 19 so as to cut off the electric power at a preset safety position as the micrometer mechanism is descending or moving downward. In addition, there is provided at the lower end of the Micro-switch 89 a control rod 91 for engaging the stop arm 92 so as to shut the motor off at a predetermined safety limit height as the relative moving parts of the micrometer mechanism are ascending or moving upward. The stop arm 92 is adapted to be secured to the top of the motor and passes or moves through an opening 93 in the support slide tube 48, and the Micro-switch is adapted to be used for preventing damage to the motor unit and the micrometer mechanism so that a safety device is provided.

Figures 2A, 8:
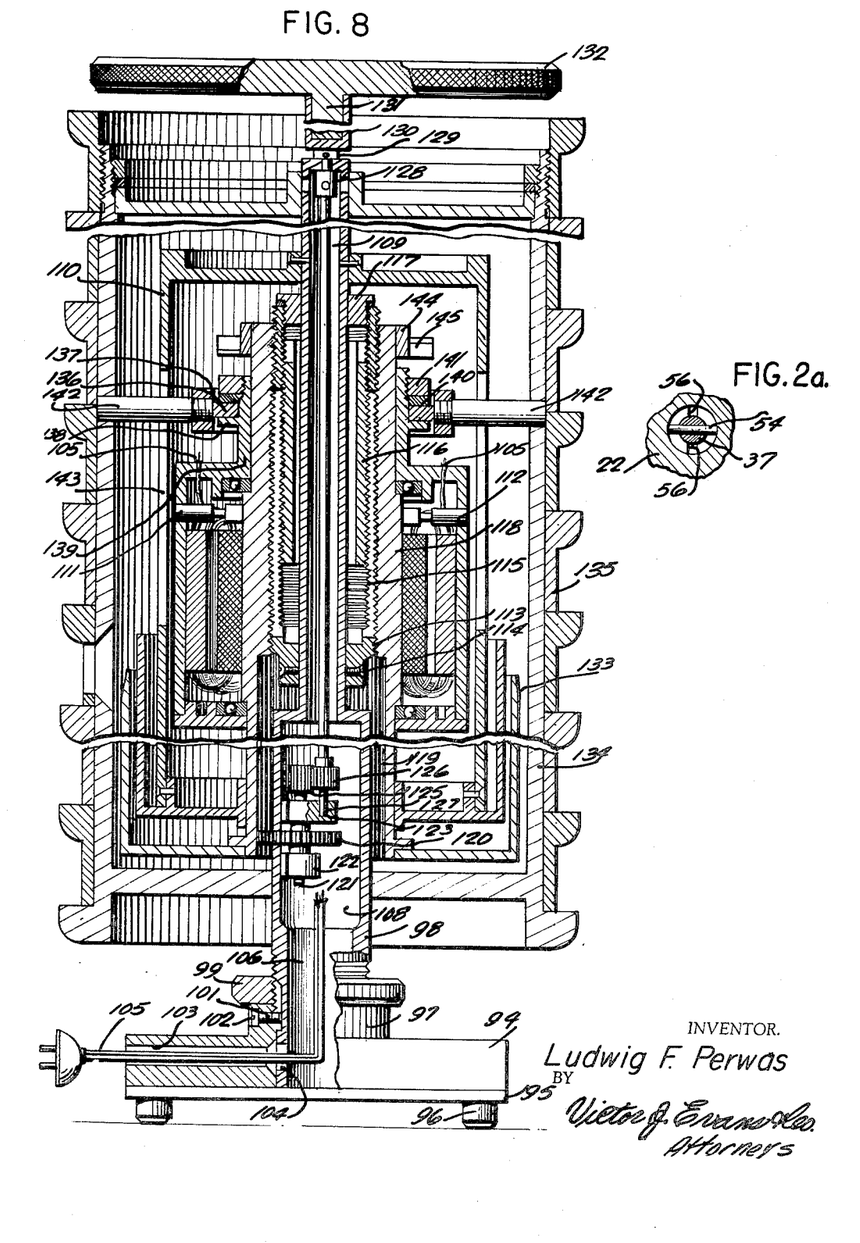
FIGURE 2a is a fragmentary sectional view illustrating certain constructional details of the device of FIGURE 1.
FIGURE 8 is a longitudinal sectional view illustrating a modification and showing the motorized micrometer mechanism in a reverse position.

Referring now to FIGURE 8 of the drawings, the micrometer mechanism is shown in a reverse position, and the barrel sleeve and thimble are constructed within the multiple gage support sleeve. The numeral 94 indicates a base which has a backing plate 95 as well as auxiliary supports 96, and if desired these supports 96 may be made adjustable, and there is also provided a neck like portion 97 which has a bore for engaging a hollow stepped support shaft 98 that is partially threaded at the bottom for engaging the full inch adjuster 99 and a key slot 100 which engages the pin key 101. The pin key 101 is secured by the set screw 102 so as to lock the hollow step shaft 98 firmly in position. As shown in FIGURE 8, the lead wires 105 extend through the bore 103 in the base 94 and hole 104 in the shaft 98 and these lead wires extend through the bore 106, cylindrical gear chamber 108, gear drive shaft chamber 109, separating at the top of 109 and extend through the wall of the shaft 98 so that the lead wire passes through the integral closed end of the micrometer barrel support sleeve 110, the wall of the integral upper end of the motor to the brush 111, and the other wire follows a similar path on the opposite side of the motor to the brush 112.

Arranged in engagement with the small outside diameter portion of the long neck of the hollow support shaft 98 is a double threaded micrometer screw 113 which is secured in place by elements such as set screws 114 at the lower integral end of the micrometer screw 113, and the micrometer screw 113 is provided with expansion slots 115, and a tapered threaded bushing 116 engages the corresponding inner tapered threads of the member 113 in order to compensate for micrometer thread wear.

Figures 12, 13, 14, 15:
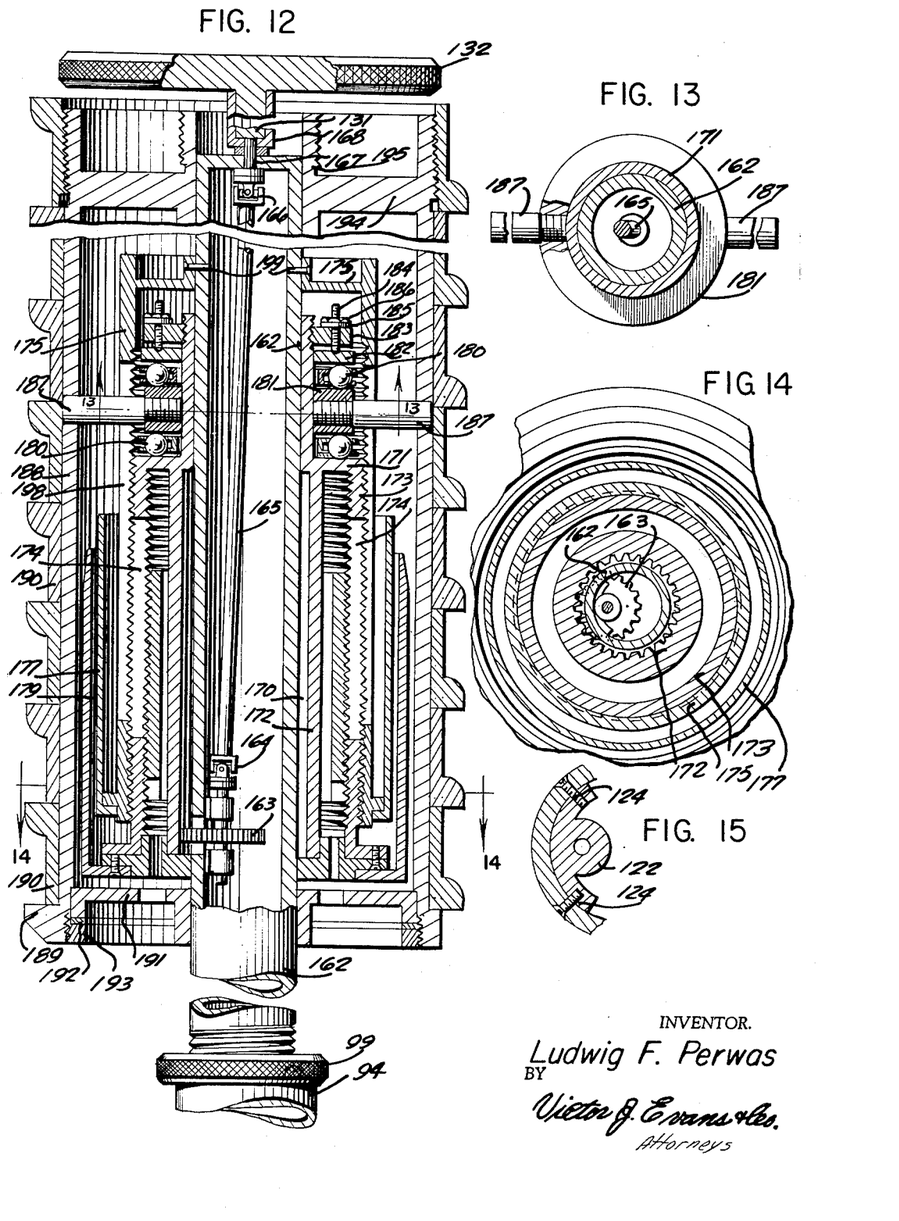
FIGURE 12 is a fragmentary sectional view of another modification wherein a manual operated reverse micrometer mechanism and a single multiple gage sleeve receiving arrangement is provided for aliging the projected undersurface and oversurface same planes in a perpendicular straight line to the base of the device.
FIGURE 13 is a sectional view taken on the line 13—13 of FIGURE 12.
FIGURE 14 is a sectional view taken on the line 14—14 of FIGURE 12.
FIGURE 15 is a fragmentary sectional view showing the method of securing bearing blocks to a tubular wall.

The open end of the micometer screw 113 is arranged in engagement with a threaded bushing 117 with a bore engaging the small outside diameter of the shaft 98. Also the threaded portion of the armatured shaft 118 engages the outside threads of the micrometer screw 113, and the armature shaft 118 has a gear arrangement for manual fine adjustment of the micrometer mechanism. The gear teeth 119 in the armature shaft 118 are arranged in engagement with a drive gear 120 which is suitably mounted on a shaft 121, and the shaft 121 is arranged in engagement with bores in pillar blocks 122 and 123 which are secured to the wall of the cylindrical gear chamber 108 by screws 124, as for example as shown in FIGURE 15.

The shaft 121 has a gear 125 mounted on the end thereof which extends through the pillar block 123 and which engages a gear 126 that is mounted on the extension drive shaft 127 and the lower end of the shaft 127 is freely supported in a bore of a pillar block 123. The upper end of the shaft 127 is freely supported in a centrally positioned bore at the top of the shaft 98. Referring to the top portion thereof, the shaft 127 is held in position by two collars 128 and 129. Formed integral with the shaft 127 or secured thereto is an elongated rectangular square portion 130 having the same shaped recess for engaging an elongated rectangular square portion 131 of the knurled adjusting wheel 132. Thus, by rotating the knurled adjusting wheel 132, the shaft 127 will be driven so as to actuate the gears 126, 125 and 120. Since the gear 120 engages the gear teeth 119 of the armature shaft 118, the armature shaft 118 will be driven and the armature shaft 118 has attached thereto the micrometer thimble 133 so that the micrometer thimble 133 will be moved with the rotating motion up or down depending upon the direction of rotation of the adjusting wheel 132.

As the armature shaft 118 moves up or down the multiple gage support sleeve 134 and the gage rings 135 which are attached move with it, and the entire motor moves with the armature shaft 118 and at the upper end of the motor housing the inner flange 136 of the key lift rod retainer 137 is secured to the flange 138 of the motor housing extension 139 by the lock washer 140 and nut 141. In addition the threaded recess in the key lift rod retainer 137 is secured to the flange 138 of the motor housing extension 130 by means of the lock washer 140 and nut 141. In addition the threaded recess and the key lift rod retainer 137 are arranged in engagement with the threaded end of the key lift rod 142 while the other end of the key lift rod 142 is arranged in engagement with a precision bore in the multiple gage support sleeve 134, and these key lift rods extend through the key slot 143 of the micrometer barrel support sleeve 110. Since the sleeve 110 is secured to the shaft 98, the support sleeve 134 and relative gage rings 135 are keyed in position relative to the base 94 and shaft 98. With the lead wires connected to a standard reversing switch and outlet, the spinning of the armature shaft 118 by the electric power source will move the relative parts, motor, thimble, support slide tube and attached gage blocks, key lift rods, key lift rods retainer, and the like, up and down depending upon the direction of rotation of the armature shaft 118. As shown in FIGURE 8 if desired a fan including a hub 144 and blades 145 are adapted to be optionally attached to the upper end of the amature shaft 118 as desired or required.

Figure 9:
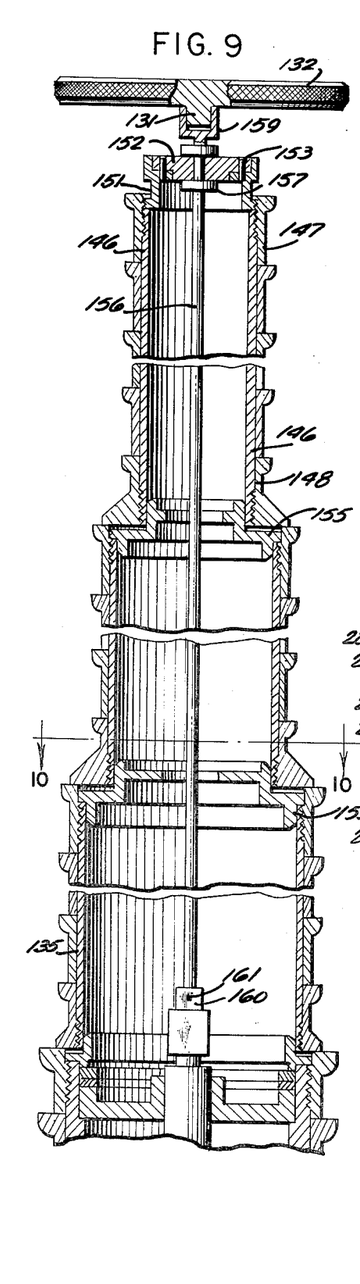
FIGURE 9 is a fragmentary sectional view showing the use of a device such as that of FIGURE 8 wherein telescoping multiple gages are stacked on top of the device.
Figure 10:
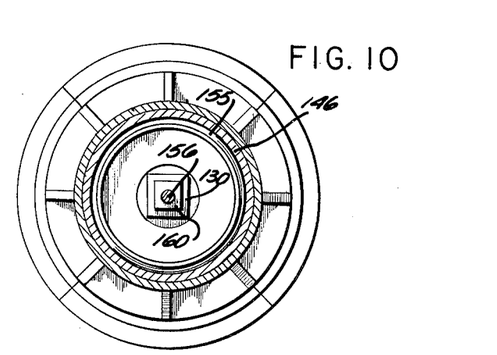
FIGURE 10 is a sectional view taken on the line 10—10 of FIGURE 9.

Attention is now directed to FIGURE 9 of the drawings wherein there is illustrated assembled telescoping storage multiple gage units for extending the height of the reversed type tubular planer gage and it will be seen that this consists of a multiple gage support sleeve 146 threaded at both ends to receive a threaded gage ring 147 that is adapted to engage the top threads of the sleeve 146 and to engage the bottom threads of the sleeve 146 a gage ring 148 is provided, the gage ring 148 having the outside diameter of the lower under surface indicating areas as large as the outside diameter of the tubular section of the gage ring 148 to permit stacking of one extension unit on another. The outside diameter of the top oversurface upon which the gage ring 148 is stacked is larger than the outside diameter of its tubular section so as to permit oversurface readings and the stacking of one gage ring upon another results in greater accuracy.

The gage sleeve 146 and the gage rings are aligned by a stepped alignment ring 155. The top gage support sleeve 146 is provided with an extension retainer 151 for receiving a shaft support retainer 152 which is held in place by dowel pins 153 that are secured to the retainer 152 by a press fit. The numeral 156 indicates a shaft which is supported in the axial bore of the retainer 152 and which is held in place by collars 157 and 158 and it has at its upper end an integral rectangular recessed driver 159 for engaging the rectangular projected portion 131 of the knurled adjusting wheel 132 and at the lower end of the shaft 156 a similar rectangular shaped fitting 160 is secured by dowel pins 161. By operating the fine adjustment wheel 132 shown in FIGURE 9, the micrometer screw is actuated through the shaft 156, gears 126, 125 and 120, as the gear 120 operates the armature shaft 118.

Referring now to FIGURE 12 of the drawings there is shown a manually operable modification of the device of FIGURE 8 which consist of a base 94 that supports a full inch knurled ring adjuster 99, a hollow support tube 162 having a single manual drive gear 163 connected by a universal coupling 164 to a shaft 165, and the shaft has at its upper end another universal coupling 166 that engages a shaft end 167 of the rectangular recessed drive 168 which extends through an axial bore in the top of the support tube 162.

The rectangular projection 131 of the adjusting wheel 132 engages the recessed drive 168. Also the manual drive gear 163 is arranged so that it projects through an opening 169 in the tube 162 to engage the elongated inner gear teeth 170 of the micrometer screw 171 and the micrometer screw 171 is provided with an inner elongated gear wall 172 as well as a micrometer screw wall 173. The screw wall 173 is provided with an inner tapered thread as well as slots 174 to permit adjustment of the outer micrometer threads that engage the threaded barrel support 175.

A graduated micrometer barrel 177 is affixed to the flange 176 of the support 175, and connected to the flange 178 of the micrometer screw 171 is a graduated thimble 179. There is provided at the upper end of the micrometer screw 171 a lift rod retainer 181 which is secured between two caged thrust bearings 180 that are held freely in place by the upper surface of the micrometer screw 171, the thrust plate 182, the threaded lock plate 183, the adjustment screws 184, lock washer 185 and nuts 186. The threaded end of the key lift rod 187 are arranged to engage the threaded bores of the key lift rod retainer 188 at one end while the other end firmly engages a precision bore in the support tube 188. The key lift rods 187 are keyed in position as they pass through the elongated key slots 188 of the barrel support 175 that is firmly affixed to the support tube 162 by means of securing elements such as screws 199. Banked against the upper surface of the flange 189 of the support tube 188 are multiple gage blocks 190 which are affixed in place by means of a threaded upper gage ring which engages the upper threaded end of the support tube 188, and at the lower end of the support 188 the bore of a guide bushing 191 engages the outside diameter of the hollow support tube 152 and is secured to the support tube 188 by the lock washer 192 and lock ring 193. The other end of the support tube 188 has an integral disc wall 194 with a guide bore engaging the outside diameter of the tube 162 with the extended threaded portion 195 engaging the extension locking tube 196 in FIGURE 16 in order to secure the extension multiple gage section 197 to the device in FIGURE 12.

It is to be noted that as the manually knurled manipulating wheel 132 is rotated, the shaft 165 rotates the drive gear 163 which in turn rotates the micrometer screw 171 so as to cause the screw 171 and the thimble 179 to move up or down depending upon the direction that the wheel 132 is rotated. As the micrometer screw 171 moves up or down the multiple gages 190 and support tube 188 move in the same direction and the same amount or distance as the graduated lines of the graduated thimble 179, relative to the elongated base line 200 of the graduated barrel 177, since they are firmly connected to the micrometer screw 171 by means of the key lift rod 181, key lift rods 187 and their securing mechanism.

Figures 16, 17, 18:
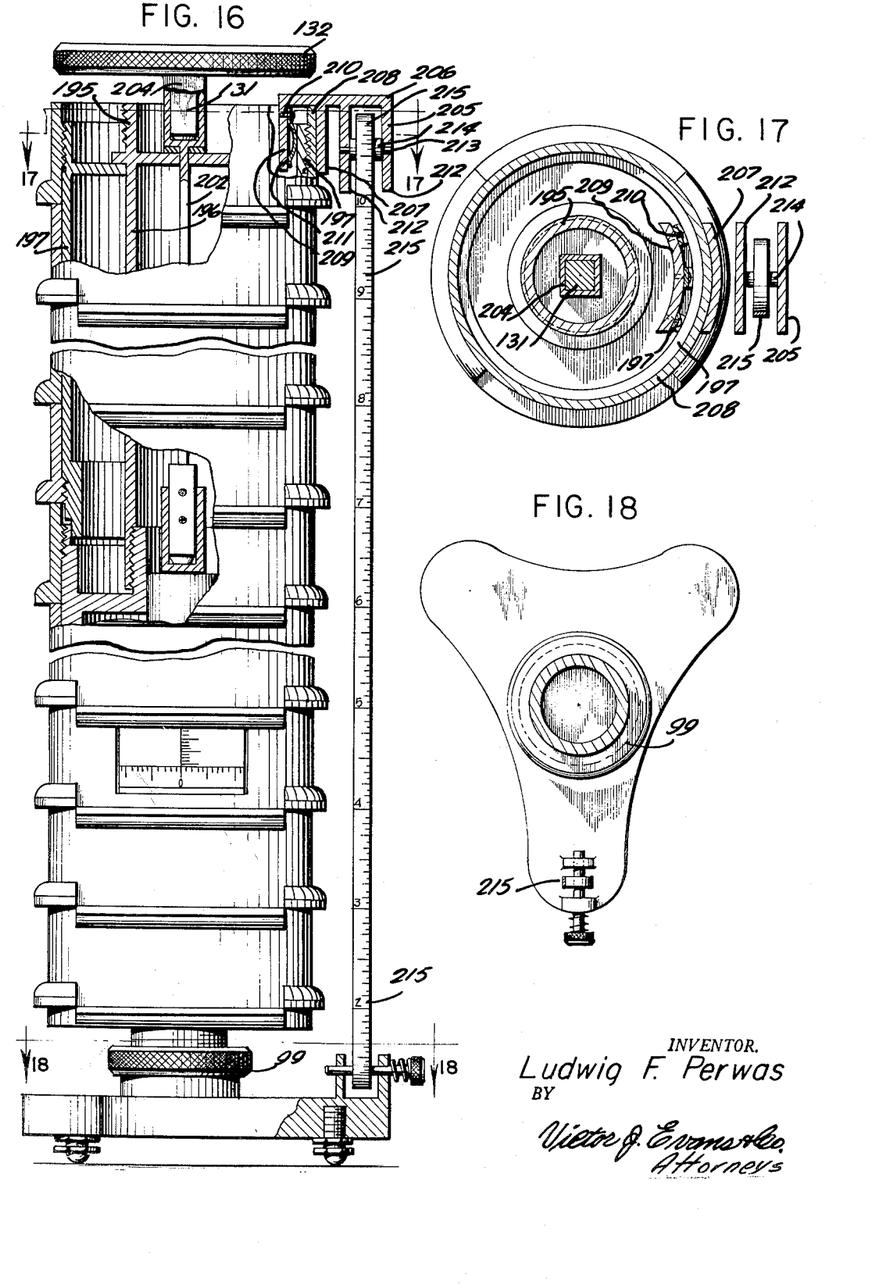
Figures 19, 20, 21, 23, 25, 26, 27, 28, 30:
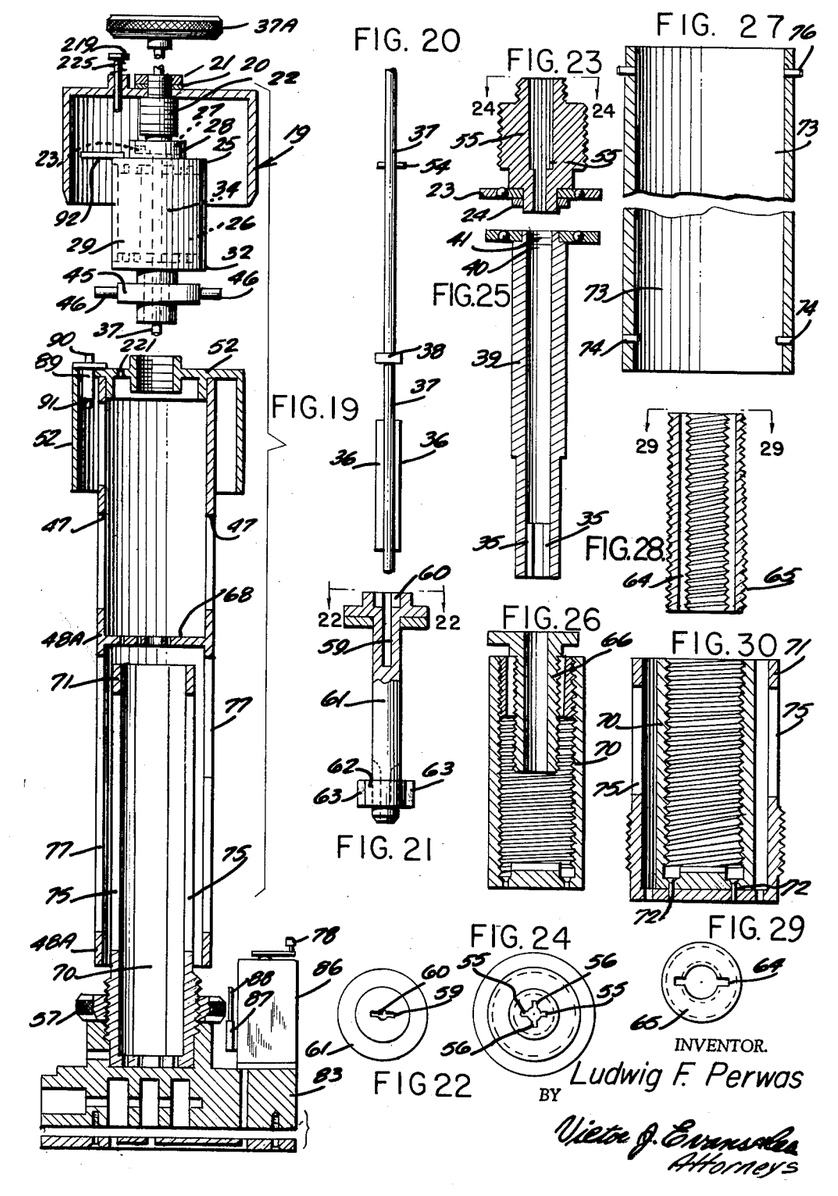

In FIGURE 16 there is illustrated a multiple stacking gage unit 201 of the same size which includes a multiple gage sleeve 197 with gages secured thereto by threaded end gages which engage the threaded ends of the sleeve 197, and an extension shaft 196 engages at the lower end the extension portion 195 of the integral disc portion 194 of the sleeve 188 in order to secure the multiple gage ring extension unit firmly in place. The other end of the locking extension sleeve 196 is provided with threaded portion 195 for receiving another multiple gage ring extension unit. The shaft 202 and the ends 203 and 204 are of similar construction and operation as the previously mentioned or described extension drive shafts and this type of extension drive shaft construction permits the lengthening of the drive shaft 202 according to the number of multiple gage ring stacking units that are being used.

The numeral 205 indicates a snap-on self winding rule holder which includes a top base plate 206, and there is provided a curved integral banking wall 207 which engages the top gage ring wall 208 at the clear undersurface position and there is also provided an integral spring clip bracket wall 209 which has attached thereto by means of a screw 210, a sheet metal snap on spring 211 for contacting or engaging the upper inner surface of the sleeve 197 with sufficient force to secure the self winding rule holder 205 firmly in position. Two parallel integral walls 212 having a free rotating shaft 213 to which is secured by collars 214 a self-winding rule 215. The free end of the rule 215 is attached to the shaft 216 of the rule adjuster 217, and this type of snap on rule holder 205 permits it to be switched to the uppermost multiple gage sleeve unit that is being utilized.

As shown in FIGURE 1, a locking pin 218 which includes a spring retaining flange 219 engages a compression spring 220, and the pin 218 is adapted to engage the tapered recess 221 when the zero graduation of the thimble 19 is at or near the zero graduation of the barrel 52, and the control rod 37 is dropped through slots 56 to engage the telescoping unit. The under surface of the knurled wheel 37A forces the pin 218 into the recess 221 so as to lock the micrometer mechanism in place while the telescoping unit is being operated.

Figure 31:
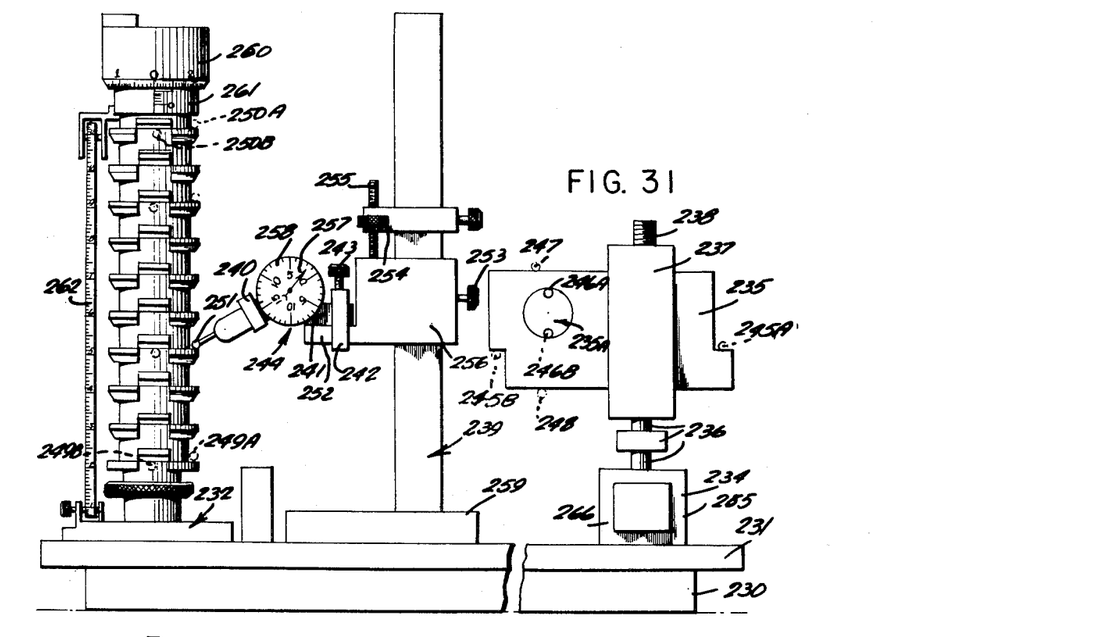
FIGURE 31 is a view illustrating the present invention in use.

Referring to FIGURE 31 of the drawings, the numeral 230 indicates a surface plate which has a precision flat surface 231 on which at the left hand side thereof is an integral alternating same plane tubular micrometer planer gage 232, while at the right hand side of the plate 230 on the surface 231 is a precision parallel block 234 to which is attached a work piece 235 to be checked and secured to the block 234 by means of an alignment universal 346, ring clamp 237 and lock screw 238. Positioned between the gage 232 and the precision parallel block 234 is a standard height gage 239, without graduations, to which is secured by means of an indicator clamp 240, indicator extension arm 241, clamp 242 with lock screw 243, and a dial indicator 244.

The work piece 235 which is secured to the block 234 has the following surfaces to be checked. Oversurface 245A and undersurface 245B which are on the same plane and parallel to the surface 231, oversurface 246A of the bore 235A, undersurface 246B of bore 235A, oversurface 247, and undersurface 248.

The gage 232 starting at two inches above the surface 231 has ten measuring planes each one consisting of an oversurface A and an undersurface B as follows. At two inches 249A and 249B; at three inches there will be corresponding measuring planes, at four inches, five inches, six inches, seven, eight, nine and ten inches and eleven inches there will be corresponding measuring planes, and for example at eleven inches the measuring planes are indicated at 250A and 250B. The measuring planes, due to the provision of a connected one inch movement, range up or down above the surface 231. The indicator ball 251 of the dial indicator 244 is shown resting on or in contact with an oversurface corresponding to five inches. The indicator ball 251 is adapted to be arranged in contact with various oversurfaces and undersurfaces of the gage 232, and the work piece 235 and it is thought that this will illustrate the operation of the gage 232 as well as the importance of the integral oversurface and undersurface measuring plane.

The indicator ball 251 of the dial indicator 244 is brought into contact with a surface of the work piece 235, and the height gage slide anchor clamp 252 is rigidly secured to the rectangular shaft of the member 239 by means of its lock screw 253. The knurled adjusting nut 254 engages the threaded shaft 255 which is secured to the slide 256 and is manipulated in a counter-clockwise direction in order to apply pressure to the ball 251 when it is contacting an oversurface so as to set it on zero, and it is operated in a clockwise direction when the ball 251 is contacting an undersurface also to set the ball 251 on zero. The ball 251 first contacts an oversurface 245A of the work piece 235 and therefore the adjusting nut 254 is manipulated in a counter-clockwise direction so as to apply sufficent upward pressure to the ball 251 in order to cause the indicating needle 257 to move from 15 (.015) on the indicator dial face 258 to zero so as to apply a pressure range of .015 to the ball 251.

Also, after the indicator needle 257 is set to zero on the work piece 235, the standard height gage 239 is carefully slid on its base 259 over to the planer gage 232 so that the ball 251 of the indicator 244 can contact an over surface of the gage 232.

It is to be noted that in order for the ball 251 to contact a suitable surface, the height of the ball 251 is first visually checked to determine how it corresponds with the apparent suitable measuring surface. Thus, if the apparent gage surface appears to be too high above the ball 251 to engage it without disturbing the accuracy of the zero setting, then the apparent surface is lowered by manipulating the micrometer thimble 260 in a clockwise direction. It is to be noted that by manipulating the thimble 260 in a counter clockwise direction the measuring planes on the gage 232 will be raised and by operating the thimble 260 in a clockwise direction the measuring planes of the gage 232 will be lowered. Next, the standard height gage 239 is slid in close to the planer gage 232 so that the ball 251 is directly over a suitable projecting measuring surface, and the gage 232 is then raised until the ball 251 is pressed upward whereby the indicator needle 257 is set on the zero the same as it was on the work piece 235. A reading is then taken from the micrometer mechanism and recorded on a sheet of paper. The reading is obtained by taking the full one hundred thousandths (.100) from the graduations on the barrel 261, and the fraction of the one hundred thousandths from the graduations of the thimble 260. The full inches above the surface 231 is taken from the self winding scale or rule 262. The reading on the gage 232 in FIGURE 31 is as follows: Five inches and one hundred twenty five thousandths (5.125). The self winding rule 262 reads five inches (5"), the barrel 261 reads one hundred thousandths (.100), and the thimble 260 reads twenty five thousandths (.025).

Taking a reading on the gage 232 of any two flat surfaces on the work piece 235 parallel to the surface 231 of the plate 230 and substracting the smaller reading from the larger will result in the distance between the two said flat surfaces as for examples such as 248 from 247, 245A from 247, 245B from 247, 248 from 245A, 248 from 245B, and the like.

The bore 5A is parallel to the surface 231 so that by subtracting a reading of 246B the bottom of the bore 5A from the top 246A will result in the size of the bore at this position. Dividing the result by two and adding it to the reading 246B or subtracting it from the top 246A reading would result in a center line reading of the bore 5A above the surface 231. By taking a center line calculated reading above the surface 231 it can be subtracted from another centerline reading or flat surface reading, in order to find the distance between them. The other readings can also be subtracted from the centerline reading. The reading closer to the surface 231 is subtracted from the reading further away from the surface 231, which results in the distance between the two readings.

To take a reading of 246A, 245B or 248 of the work piece 235 the indicator has a reversing lever (not shown) which is adapted to be in reverse before the ball 251 contacts the above surfaces of the workpiece 235. Certain procedures of taking an oversurface reading are reversed as follows. If the apparent measuring surface is too low for properly contacting the ball 251 the surface is raised by manipulating the micrometer mechanism accordingly. The standard height gage 239 is slid in toward the gage 232 so that the ball 251 of the indicator 244 is directly under the apparent measuring plane before lowering the apparent measuring surface to contact the ball 251. It is lowered until the indicator needle 257 is at the corresponding line on the indicator face 258 than it was on the surface contacted on the work piece 235. (It is usually set to zero on the workpiece 235.) The contacted measuring plane or surface is then precisely or exactly the same distance above the surface 231 of the surface plate 230 that the contacted surface of the workpiece 235 is, and by taking the reading from the barrel 261 and thimble 260 of the micrometer mechanism and adding it to the full inches, the apparent measuring plane or surface is above the surface 231 will result in the precise or exact distance the contacted surface of the workpiece 235 is above the surface 231 of the surface plate 230.

There is illustrated in FIGURES 32 through 35 certain devices which may resemble certain portions of the device of my prior Patent No. 2,914,857, and they may either have double scales to allow for oversurface readings 264 and undersurface readings 265, a single scale where the undersurface reading is obtained by subtracting the standard precision thickness between oversurface 264 and undersurface 265 of the gage from the single scale which is graduated according to or relative to the oversurface 264 only. Another method is to use a detachable precision flat sided plate 266, which when inserted between the parallel measuring surfaces, is held in place by a soft metal leaf spring 267. The integral alternating same plane oversurface and undersurface micrometer planer gage of the present invention has the following unique and important advantages over the prior similar devices: It is more accurate (integral same plane accuracy), there is no extra cost for attachment initial cost or replacement due to misplacement, multiple integral same planes cannot be misplaced, there is less calculating so less chance of a mistake being made, and this further simplifies the job by less calculating, it is easier to use, and a faster check is due to integral same plane, and the like.

In addition, the opposite faces or surfaces of the box parallel 234 are parallel to each other and all faces or surfaces adjacent to each other are precisely square to each other so that if the block 234 is rotated ninety degrees and placed on suitable high parallel surface so that the overextended end of the work piece 235 does not interfere with the surface 231, the dimensions at ninety degrees can be checked. It is to be noted that the ends of the work piece 235 extend beyond backing surfaces 265 and 266 of the block 234.

Certain prior devices have utilized a one scale micrometer mechanism with the under readings taken by subtracting the thickness of the points 264 and 265 which are specified as being exactly a half inch (.500,000). The extra calculation would lead to more errors and since it is not on the same plane would lead to additional possibility of errors so that such devices have been complicated to use and required more time and the present invention eliminates these short comings.

The double scale micrometer mechanism with the oversurface 264 and the undersurface 265 being apart present the same problems as previously mentioned prior art device. An attachment such as the attachment 266 has the same disadvantages and in addition a member such as the member 266 has a tendency to accumulate dirt or other foreign matter so as to prevent or interfere with a precise relative contact with the surface 264, and the attachment 266 may be misplaced, and the precision flat surface may be damaged due to excessive separate handling of the attachment, and there will be slower checking due to the extra handling of the attachment 266. The present invention is thus an improvement over such devices, and in the present invention there is provided an integral construction which is adapted to be assembled at the factory under strict manufacturing supervision and the device is adapted to be thoroughly checked before being sold to make certain that the same plane measuring surfaces are properly seated and integrally securd in place.

In addition the attachment 266 is easily handled by machinists, inspectors and the like without checking each time it is attached to the device to see that the attachment 266 is properly seated. The checking to see that the attachment 266 is properly seated is time consuming and adds to the time required for the handling of the attachment 266 which is a further disadvantage.

Figures 32, 33:
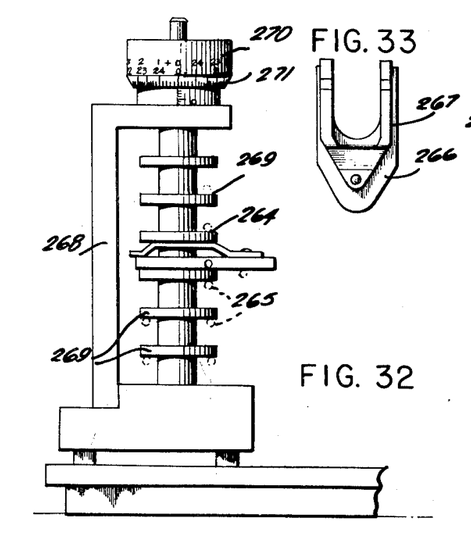

In FIGURE 32 the numeral 268 indicates the frame support.

The dial face 258 is adapted to have numerals thereon which corresponds to the thousandths movement of the indicative 244 which has an indicating range of thirty thousandths (.030).

Considering further FIGURE 32, the numerals 269 indicate measuring flanges, and the numeral 270 and 271 indicate the first and second scales on the thimble. Undersurfaces are read on the second scale or thickness is subtracted from the first scale, and all measuring flanges are exactly the same thickness. FIGURE 32 shows the flanges and these flanges as indicated by the numeral 269 are exactly the same and have the same thickness. In FIGURE 32 the undersurface reading on the flange is read on the second scale or the standard thickness of the measuring flange is subtracted from the first scale reading. Two scales increase errors since the wrong scale may be read and in addition increase the time to check the job as a person will have to stop and think which scale should be used. Subtracting the thickness from the first scale increases the time and leads to more errors such as causes more work to check a job.

Figures 34, 35, 36:
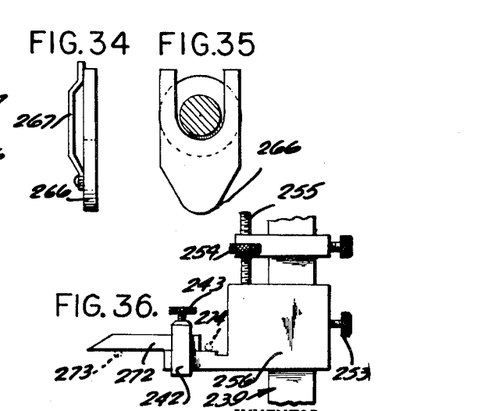
FIGURE 34 is a view taken at right angles to the view shown in FIGURE 33.
FIGURE 35 is a view looking at the opposite side from FIGURE 33.
FIGURE 36 is a fragmentary elevational view showing a variation or modification of the assembly of FIGURE 31.

As shown in FIGURE 36 the indicator arm to which is attached the dial indicator 244, is adapted to be removed when desired or required, and a scriber 272 is secured in its place when it is necessary to scribe lines on the work piece being checked. The gage is set and the scriber surface is set to the set plane of the gage.

An important aspect or feature of the present invention is the provision of a permanent integral alternating same plane multiple micrometer planer gage.

Using one standard height gage by itself the undersurface and oversurface are not functional. Only when using it in conjunction with another standard height gage or with a multiple planer gage can oversurface and undersurface be realized and this is not generally known by most inspectors, machinists and the like.

With further reference to FIGURE 36, by obtaining the center line of the bore above the plate surface and adding a predetermined numerical value, the scriber 272 can be set to the relative measuring plane of the gage, and then a line can be scribed on the work piece, and the other dimensions can be calculated relative to the plate surfaces and this can be repeated. In FIGURE 36 the numerals 273 and 274 indicate the undersurface and oversurface measuring points. As previously stated the integral construction is a very important aspect of the present invention.

The present invention in addition to providing a same plane undersurface and oversurface construction and arrangement, it is also directed to a tubular offset undersurface and oversurface same plane projected measuring surface means, and wherein also the present invention is adapted to be used in connection with circular offset projected undersurface and oversurface measuring surfaces, and as a tubular offset undersurface and oversurface same plane measuring surface mechanism. The tubular offset undersurface and oversurface same plane measuring surface construction and arrangement combination is believed to be entirely new as stated herein.

Some of the advantages of the present invention are as follows. Greater accuracy is insured at no extra cost, and misplacement of the parts when the device is not in use is eliminated, and also multiple same plane is provided for, and the device is easy to use and a quicker check is possible. The ball of the indicator point of the dial indicator is attached to extended height gage.

With further reference to FIGURE 1, the numeral 64 indicates a drive pin, and the numeral 65 indicates a partial slot for engaging the pin 64 when the micrometer mechanism is set to be motor driven. The slots 56 permit the pin 64 to enter the circular clearance space 58 so that the pin 64 can freely rotate within the space 58, completely disengaged from the micrometer screw 22. As the pin 64 passes through the slot 56, the under face of the knurled adjusting nut 37A contacts the flange 219 of the lock pin 218 which is held in an upward position by the compression spring 220. As the lock pin 218 engages the corresponding lock pin recess 221 so as to secure the thimble 19 and screw 22 in position while the telescoping mechanism is in operation.

Instead of forty threads per inch (.025) movement for one complete turn of the thimble and the barrel graduated four lines to every hundred thousandths, it could be ten threads per inch (.100) movement for one complete turn of the thimble and the barrel graduated only every hundred thousandths and the thimble graduated evenly every ten thousandths of an inch since this is satisfactory with a larger thimble than an ordinary one-inch micrometer.

Some of the important features of the present invention are as follows: There is same plane undersurface and oversurface checking surfaces, and there is a motorized micrometer mechanism which includes the motor shaft construction, the micrometer screw 22 construction, the control rod 37, and the special construction of the end caps. In addition, the telescoping motorized mechanism and the rewind spring 85 and associated parts, as well as the reverse motorizing micrometer mechanism, see FIGURE 8, and the micrometer window of FIGURES 8 and 12 are important. The telescoping storage stacking multiple gage units of FIGURES 9, and the construction shown in FIGURES 11 and 12, as well as the stacking arrangement of FIGURE 16 and the securing means 195, and the shape of the base in FIGURE 18 are believed to be highly advantageous and important.

It will therefore be seen that there has been provided planer height gages which may have a motor or other suitable power driving mechanism to automatically operate the telescoping extension driving mechanism or the micrometer mechanism independently and the present invention provides for a more advanced method of increasing the height of the planer height gages and for taking undersurface and oversurface readings from the same plane. With the present invention there is provided a planer height gage that has a motorized telescoping mechanism for increasing the functional height of this type of device as well as a motorized micrometer mechanism for easier operation and which provides unique projected same plane surfaces for taking undersurface and oversurface readings from the same plane.

While various attempts have been made to provide planer height gages, prior devices have been difficult to use, time consuming and tiring to operate but with the present invention there is provided an integral telescoping motorized extension mechanism or top stack multiple gage sleeve to increase functional height, as well as a unique projected same plane surface for taking the undersurface and oversurface readings from one plane, and a motorized micrometer mechanism to eliminate time consuming tiring manual operation of this type of device. Thus it will be seen that there has been provided a motorized means for operating the telescoping and micrometer mechanism and there has also been provided a unique projected same plane surfaces for taking undersurfaces and oversurface readings more quickly for greater economy, and a new method of extending the functional height of the device by adding to the top of the device a multiple gage sleeve while still maintaining the functioning of the manual top small range adjusting wheel and motorized micrometer mechanism. In addition the functional height is extended by actually adding a group of useful gages to the device to increase the measuring range of the device, and the device can be stored in small spaces, and there is provided the motorized unit mechanisms, the same plane projected surfaces and the top stack multiple gage sleeve and wherein the device is of a simple and economical construction.

The invention includes a planer height gage having telescoping means or a non-telescoping multiple gage sleeve. The telescoping means is attached at its lower end to a base support and within the upper end of the telescoping tube having the projection gages a motorized micrometer mechanism with a manual small range control knob or wheel above it. The non-telescoping multiple gage sleeve extension is attached to a reverse micrometer mechanism above it and the reverse micrometer mechanism at its lower end is attached to a base support by means of an axial shaft. Extending through the non-telescoping gage sleeve when it is attached to the device is an extension drive shaft for extending the manual small range control wheel so as to operate it at the top of the device.

In FIGURE 8 there is illustrated a sectional view of a modification showing the motorized micrometer mechanism in a reverse position to provide for increasing the functional height of the device by securing a telescoping multiple gage on top of the device, and the telescoping is in reference to enable the multiple gages to be stored one within the other.

In FIGURE 12 there is illustrated a sectional view of a modification of the device shown in FIGURE 8 wherein there is provided a manual operated reverse micrometer mechanism and a single multiple gage sleeve receiving arrangement for aligning the projected undersurface and oversurface same planes in a perpendicular straight line to the base of the device.

In FIGURE 14 there is illustrated a micrometer rotating gear, and in FIGURE 15 there is shown a method of securing the bearing blocks to a tubular wall. In FIGURE 16 there is shown a view wherein the parts are rotated ninety degrees as for example from FIGURE 12, and wherein there is illustrated a micrometer reading opening and the attached single multiple gage secured to the top of the device and the unique removable means for securing a self winding rule in position.

Figures 11, 37, 38, 39:
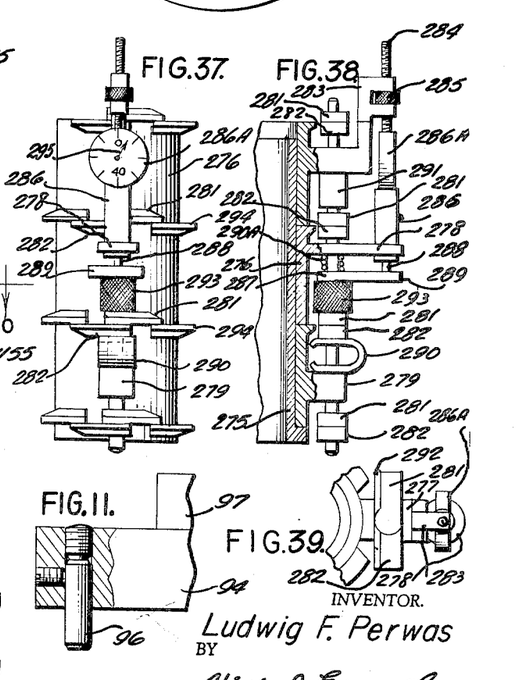
FIGURE 11 is a fragmentary sectional view illustrating auxiliary or optional adjustable base alignment plugs.
FIGURE 37 is a longitudinal plan view of the scriber setting means.
FIGURE 38 is a longitudinal partial view of the device of FIGURE 37 and taken subustantially at right angles thereto.
FIGURE 39 is a top plan view of the device of FIGURE 38.

In FIGURE 37 there is illustrated a longitudinal plan view of the scriber setting means, while FIGURE 38 is a longitudinal partial view of the device of FIGURE 37 turned ninety degrees, and FIGURE 39 is a top plan view of the device of FIGURE 38.

Attached to the support tube 275 are ring gages 276 of which several ring gages have integrally attached bearing blocks 277, 278 and 279 which engage an actuating shaft 280. Attached or secured to said shaft 280 are several pairs of blocks and each pair consists of blocks 281 and 282. These pairs of blocks are attached to the shaft 280 so as to form an undersurface and oversurface same plane condition. Each same plane of the pair of blocks 281 and 282 are equally spaced the same unit measurement (one inch precisely) and approximately in line with a corresponding same plane of the tubular planer gage which is also spaced the same unit measurement (one inch precisely).

Engaging the specially constructed section 283 of the bearing block 277 is an indicator adjusting threaded shaft 284 which is held in place and raised or lowered by the knurl adjusting nut 285. Attached to said shaft 284 is a dial indicator 286 having a dial or dial face 286A which is supported at the lower end of 286 by an integral support 278 of a ring gage 276. An indicator needle 288 of 286 contacts a setting plate portion 289 of the support 287 which is secured to the shaft 280. Resting on the bearing block 279 is a removable leaf spring 290 for urging the shaft 280 and attached parts upwardly. The same plane formed by the blocks 281 and 282 is limited to a small vertical movement (.030) on a larger range indicator by the spacer collar 291 so as to keep it (same plane) close to the corresponding same plane projection 294 of the planer gage, to save time and simplify the use of the scriber setting means.

The blocks 281 and 282 are provided with a chamfer 292 for easier engaging of the same plane surfaces of 294. Gripping the knurl nut grip 293 the shaft 280 is manipulated so that the undersurface of the block 281 contacts the oversurface of the projection 294. Then, the dial indicator 286 is adjusted by manipulating the knurl nut 285 until sufficient pressure is applied to the indicator needle 288 as the shaft 280 contacts the setting plate portion 289 so that the indicator arrow, (dial needle), 295 is set on zero of the dial 286A.

If the scriber is to scribe a line as it is shown attached to the height gage 239 in FIGURE 36, the scriber surface 273 contacts an oversurface of a block 282 applying pressure to the block 282 until the indicating arrow 295 is on zero. Then, the height gage 239 is carefully slid away from the tubular gage or the pressure is removed from the height gage 239 by lifting up the setting scriber means and the line is then scribed on the workpiece 235.

If the scriber is to be used in a reverse order from FIGURE 38, the undersurface of the block 281 is contracted by the surface 273 of the scriber after the leaf spring 290 is removed. (Note the same setting of the arrow 295 is used.) The scriber height above the surface of the surface plate is adjusted to zero by applying pressure upward against the combined weight of the shaft 280 and the attached parts and the light spring pressure of the compression spring 290A. (Note the leaf spring 290 tension is made strong enough to urge the shaft 280 and attached parts upwards when the leaf spring 290 is in place.) Instead of the leaf spring, a slotted rectangular or cylindrical piece of resilent material such as sponge rubber or polyethelyn with slotted metallic disc glued on each end may be used.

Minor changes in shape, size and rearrangement of details coming within the field of invention claimed may be resorted to in actual practice, if desired.

What is claimed is:

1. A height gage comprising a base having a backing plate and auxiliary supports attached thereto, said base further including a neck-like portion provided with a bore, a hollow stepped support shaft engaging said bore, adjustment means arranged in engagement with said support shaft, said support shaft including a chamber therein, a barrel support sleeve surrounding said support shaft, a motor mounted between said support shaft and said support sleeve, electrical wires extending through said support shaft and through said chamber and connected to said motor, said motor having an armature shaft, a double threaded micrometer screw arranged in engagement with said armature shaft, a threaded bushing and said armature shaft each engaging said micrometer screw, a knurled manual adjustment wheel, means attaching said wheel to said armature shaft, a multiple gage support sleeve and a plurality of superimposed gage rings, means for moving said support sleeve and said gage rings in unison with said motor armature shaft.

2. The structure as defined in claim 1 and further including telescoping storage multiple gage units for extending the height of the tubular planer gage.

References Cited in the file of this patent
UNITED STATES PATENTS

| | | |
|---|---|---|
| 2,642,669 | Ernst | June 23, 1953 |
| 2,819,530 | Webber | Jan. 14, 1958 |
| 2,914,857 | Perwas | Dec. 1, 1959 |